United States Patent
Feo et al.

(10) Patent No.: US 10,146,828 B2
(45) Date of Patent: Dec. 4, 2018

(54) SYSTEM AND METHOD OF STORING AND ANALYZING INFORMATION

(71) Applicant: BATTELLE MEMORIAL INSTITUTE, Richland, WA (US)

(72) Inventors: John T. Feo, Kennewick, WA (US);
David J. Haglin, Richland, WA (US);
Alessandro Morari, Seattle, WA (US);
Antonino Tumeo, Richland, WA (US);
Oreste Villa, West Richland, WA (US);
Jesse R. Weaver, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 694 days.

(21) Appl. No.: 14/339,163

(22) Filed: Jul. 23, 2014

(65) Prior Publication Data

US 2016/0026677 A1 Jan. 28, 2016

(51) Int. Cl.
*G06F 9/54* (2006.01)
*G06F 17/30* (2006.01)

(52) U.S. Cl.
CPC .......... *G06F 17/30389* (2013.01); *G06F 9/54* (2013.01); *G06F 17/30958* (2013.01)

(58) Field of Classification Search
CPC ............... G06F 17/30958; G06F 19/28; G06F 19/3493; G06F 17/30392; G06F 17/30522; G06F 9/54
See application file for complete search history.

(56) References Cited

U.S. PATENT DOCUMENTS

| 9,229,603 | B2* | 1/2016 | Deimbacher | G06F 3/048 |
| 2001/0042190 | A1* | 11/2001 | Tremblay | G06F 9/30098 712/208 |
| 2007/0027905 | A1* | 2/2007 | Warren | G06F 8/51 |
| 2007/0074191 | A1* | 3/2007 | Geisinger | G06F 9/45537 717/148 |
| 2007/0214111 | A1* | 9/2007 | Jin | G06F 17/30563 |
| 2007/0214171 | A1* | 9/2007 | Behnen | G06F 8/10 |
| 2009/0077001 | A1 | 3/2009 | Macready et al. | |
| 2009/0171889 | A1* | 7/2009 | Friedlander | G06F 17/30312 |
| 2010/0094819 | A1* | 4/2010 | Bornhoevd | G06F 17/3089 707/705 |
| 2011/0285711 | A1* | 11/2011 | Kilgard | G06T 11/203 345/426 |

(Continued)

OTHER PUBLICATIONS

David Ediger, "Analyzing Hybrid Architectures for Massively Parallel Graph Analysis", Mar. 13, 2013, Georgia Institute of Technology, pp. 1-154.*

(Continued)

*Primary Examiner* — Angelica Ruiz
(74) *Attorney, Agent, or Firm* — Klarquist Sparkman, LLP (57) ABSTRACT

A system and method of storing and analyzing information is disclosed. The system includes a compiler layer to convert user queries to data parallel executable code. The system further includes a library of multithreaded algorithms, processes, and data structures. The system also includes a multithreaded runtime library for implementing compiled code at runtime. The executable code is dynamically loaded on computing elements and contains calls to the library of multithreaded algorithms, processes, and data structures and the multithreaded runtime library.

28 Claims, 4 Drawing Sheets

(56) References Cited

U.S. PATENT DOCUMENTS

| | | | | |
|---|---|---|---|---|
| 2012/0246153 | A1* | 9/2012 | Pehle | G06F 17/30864 |
| | | | | 707/723 |
| 2012/0310916 | A1* | 12/2012 | Abadi | G06F 17/30445 |
| | | | | 707/713 |
| 2013/0191351 | A1* | 7/2013 | Baym | G06F 19/28 |
| | | | | 707/693 |
| 2013/0304995 | A1* | 11/2013 | Archer | G06F 15/17325 |
| | | | | 711/147 |
| 2014/0136520 | A1* | 5/2014 | Digana | G06F 17/30424 |
| | | | | 707/722 |
| 2014/0137130 | A1* | 5/2014 | Jacob | G06F 9/46 |
| | | | | 718/103 |

OTHER PUBLICATIONS

Weaver, J., A Scalability Metric for Parallel Computations on Large, Growing Datasets (like the Web), Proceedings of the Joint Workshop on Scalable and High-Performance Semantic Web Systems, 2012.

Ullman, J. R., An algorithm for subgraph isomorphism, J. ACM, 23, 1, 1976, 31-42.

Rohloff, K., et al., High-Performance, Massively Scalable Distributed Systems using the MapReduce Software Framework: The SHARD Triple-Store, in PSI EgA '10: Programming Support innovations for Emerging Distributed Applications, 2010, 4:1-4:5.

Harth, A., et al., YARS2: A Federated Repository for Querying Graph Structured Data from the Web, in ISWC/07/ASWC/07: 6th International Semantic Web and 2nd Asian Semantic Web Conference, 2007, 211-224.

Malewicz, G., et al., Pregel: A System for Large-Scale Graph Processing, in SIUGMOD '10: ACM International Conference on Management of Data, 2010, 135-146.

Bizer, C., et al., The Berlin SPARQL Benchmark, Int. J. Semantic Web Inf. Syst., 5, 2, 2009, 1-24.

Chen, J., et al., Synergistic Challenges in Data-Intensive Science and Exascale Computing, DOE ASCC Data Subcommittee Report, Mar. 2013.

Schmidt, M., et al., SP2Bench: A SPARQL Performance Benchmark, IEEE International Conference on Data Engineering, 2010, 222-233.

"Resource Description Framework (RDF): Concepts and Abstract Syntax," retrieved from http://www.w3.org/TR/2004/REC-rdf-concepts-20040210/, on Sep. 22, 2017, 18 pages.

"SPARQL Query Language for RDF," retrieved from http://www.w3.org/TR/2008/REC-rdf-sparql-query-20080115/, on Sep. 22, 2017, 87 pages.

Abadi, et al., "SW-Store: a vertically partitioned DBMS for SemanticWeb data management," *The VLDB Journal*, 18: 385-406, 2009.

Aurelius, "Titan. Distributed Graph Database," retrieved from http://s3.thinkaurelius.com/docs/titan/1.0.0/ on Sep. 21, 2017, 2 pages.

Chang, et al., "Bigtable: A Distributed Storage System for Structured Data," *ACM Transactions on Computer Systems*, 26(2), 26 pages, 2008.

Jouili, et al., "An empirical comparison of graph databases," *IEEE Computer Society*, pp. 708-715, 2013.

Lumsdaine, et al., "Challenges in Parallel Graph Processing," *Parallel Processing Letters*, 17(1), 16 pages, 2007.

Malewicz, et al, "Pregel: A System for Large-Scale Graph Processing," *Proceedings of the 2010 ACM SIGMOD International Conference on Management of data*, pp. 135-146, 2010.

Morari, et al., "Scaling Irregular Applications through Data Aggregation and Software Multithreading," *IEEE Computer Society*, pp. 1126-1135, 2014.

Morari, et al., "Scaling Semantic Graph Databases in Size and Performance," *IEEE Computer Society*, 34(4): 16-26, 2014.

Shafer, et al., "The Hadoop Distributed Filesystem: Balancing Portability and Performance," *IEEE*, pp. 122-133, 2010.

Weaver, et al., "Toward a data scalable solution for facilitating discovery of science resources," *Parallel Computing*, 40: 682-696, 2014.

Webber, Jim, "A Programmatic Introduction to Neo4j," *Proceedings of the 3rd annual conference on Systems, programming, and applications: software for humanity*, p. 217, 2012.

Xin, et al., "GraphX: A Resilient Distributed Graph System on Spark," *First International Workshop on Graph Data Management Experiences and Systems*, 2, 6 pages, 2013.

* cited by examiner

Figure 1

```
   int DR_Node = dictionary.lookup(":DataResources");
   forEach(ANY, ":subClassOf", DR_Node, Loop1);
   forEach(ANY, ":type", DR_Node, Loop2);
......
......

// ?dataResource :subClassOf :DataResource
static void Loop1(subject, predicate, object) {
   forEach(ANY, ":subClassOf", subject, Loop1);
   forEach(ANY, ":type", subject, Loop2);
}

// ?resource :type :DataResource
static void Loop2(subject, predicate, object) {
   args_t args;
   args.resource = subject;
   forEach(subject, ":location", ANY, Loop3, args);
}

// ?location :locatedIn | :parentFeature ?next location
static void Loop3(subject, predicate, object) {
   forEach(subject, "locatedIn", ANY, Loop3, args);
   forEach(subject, "parentFeature", ANY, Loop3, args);

| dataset | 100M | | | |
|---|---|---|---|---|
| #nodes | 2 | 4 | 8 | 16 |
| ingest | 368 | 185 | 104 | 61.70 |
| Q1 | 4.74 | 4.61 | 3.35 | 2.65 |
| Q2 | 1.46 | 1.50 | 1.71 | 1.70 |
| Q3 | 7.67 | 4.93 | 3.44 | 2.26 |
| Q4 | 1.48 | 1.42 | 1.35 | 1.69 |
| Q5 | 0.824 | 0.873 | 1.02 | 1.30 |
| Q6 | 0.130 | 0.172 | 0.238 | 0.316 |

Figure 3A

| dataset | 1B | | |
|---|---|---|---|
| #nodes | 16 | 32 | 64 |
| ingest | 581 | 345 | 229 |
| Q1 | 9.89 | 6.41 | 5.61 |
| Q2 | 2.99 | 3.01 | 3.50 |
| Q3 | 12.80 | 7.21 | 4.99 |
| Q4 | 2.54 | 2.50 | 2.72 |
| Q5 | 1.87 | 1.99 | 2.39 |
| Q6 | 0.358 | 0.482 | 0.484 |

Figure 3B

| dataset | 10B |
|---|---|
| #nodes | 128 |
| ingest | 5085 |
| Q1 | 67.20 |
| Q2 | 5.30 |
| Q3 | 24.60 |
| Q4 | 5.69 |
| Q5 | 4.20 |
| Q6 | 0.835 |

Figure 3C

SYSTEM AND METHOD OF STORING AND ANALYZING INFORMATION

The invention was made with Government support under Contract DE-AC05-76RLO1830, awarded by the U.S. Department of Energy. The Government has certain rights in the invention.

TECHNICAL FIELD

This invention relates to graph databases. More specifically, this invention relates to a semantic graph database using a multithreaded runtime system.

BACKGROUND OF THE INVENTION

Data collection and analysis is rapidly changing the way scientific, national security, and business communities operate. Scientists, investigators, and analysts have an increasing need to discover the complex relationships among disparate data sources.

Most database systems are based on the relational data model. Relational databases store data in tables and process queries as a set of select and join operations on those tables. These systems are ineffective at discovering complex relationships in heterogeneous data as they are not designed to support subgraph isomorphism, typed path traversal, and community detection. Adding new relationships (e.g., another column) is difficult, usually requiring significant restructuring of internal data structures. If all records —rows of the table—do not have an entry for the new column, space is wasted. Outer join operations can generate large numbers of intermediate values that are later discarded, wasting both time and space.

SUMMARY OF THE INVENTION

In accordance with one embodiment of the present invention, a system for storing and analyzing information is disclosed. The system includes a compiler layer to convert user queries to data parallel source code and then to executable code. The system further includes a library of multithreaded algorithms, processes, and data structures. The system also includes a multithreaded runtime library for implementing parallel code at runtime. The executable code is dynamically loaded on computing elements and contains calls to the library of multithreaded algorithms, processes, and data structures and the multithreaded runtime library.

In one embodiment, the query language is SPARQL and the data parallel source code is C or C++.

The data structures of the multithreaded graph library may be implemented in a partitioned, global address space managed by the multithreaded runtime library.

The computing elements may be, but are not limited to, at least one of the following: cores, processors, or nodes.

The multithreaded runtime library exposes to the library of multithreaded algorithms, processes, and data structures an Application Programming Interface (API) that permits scheduling threads to the computing elements for execution.

The multithreaded runtime library exposes to the library of multithreaded algorithms, processes, and data structures an API that permits allocating, assessing, and freeing data in the global address space.

In one embodiment, the system further comprises a MPI message passing layer for sending and receiving messages to and from the computing elements.

The data structures in the multithreaded graph library include, but are not limited to, an array, table, graph and dictionary with the APIs to access them.

In another embodiment of the present invention, a method of implementing a graph database with an oversubscription of threads to computing elements is disclosed. The method includes converting a query language to data parallel executable code. The method further includes loading the executable code onto computing elements. The method also includes making program calls to a library of multithreaded algorithms, processes, and data structures and a multithreaded runtime library.

In another embodiment of the present invention, a system for implementing a graph database with an oversubscription of threads to computing elements is disclosed. The system includes a compiler layer to convert a SPARQL query to a C++ source code and then to executable code; a library of multithreaded algorithms, processes, and data structures; a multithreaded runtime library for implementing the algorithms, processes, and data structures at runtime; and a MPI message passing layer for sending and receiving messages to and from the computing elements.

In another embodiment of the present invention, a method of implementing a graph database with an oversubscription of threads to computing elements is disclosed. The method includes converting a SPARQL query to a C++ source code and then to executable code; loading the executable code onto computing elements; making program calls to a library of multithreaded algorithms, processes, and data structures and a multithreaded runtime library; and providing an MPI message passing layer for sending and receiving messages to and from the computing elements.

DETAILED DESCRIPTION OF THE PREFERRED EMBODIMENTS

The Present Invention includes systems and methods of storing and analyzing information. These systems and methods describe a full software stack that implements a semantic graph database for big data analytics on commodity clusters that include nodes, processors, and/or cores. The system, method and database of the present invention implements a semantic graph database primarily with graph-based algorithms, processes and data structures, at all levels of the stack. The system or database includes a compiler that converts SPARQL queries to data parallel graph pattern matching operations in C++; a library of multithreaded algorithms, processes, and data structures; and a custom, multithreaded runtime layer for commodity clusters. The system is not limited to SPARQL or C++.

Figure 1:
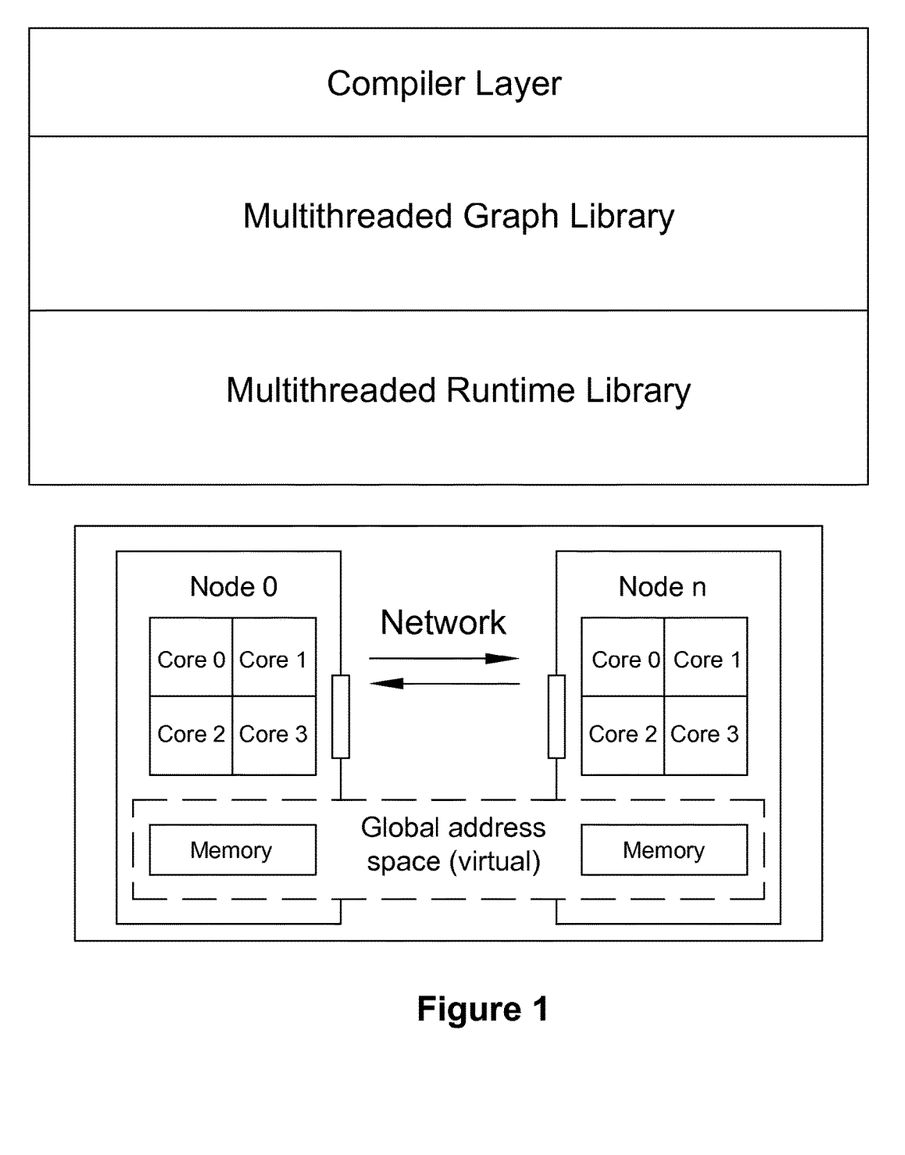
FIG. 1 illustrates a stack diagram of a system for storing and analyzing information, in accordance with one embodiment of the present invention.

FIG. 1 illustrates a stack diagram of a system for storing and analyzing information, in accordance with one embodiment of the present invention. The system includes a compiler layer, a multithreaded graph library, a multithreaded runtime library, and a plurality of computing elements or clusters containing nodes, cores, a network for managing incoming and outgoing communications at the node level, and memory for storing information in the memory system on the clusters or nodes. In one embodiment, the system further includes a MPI message passing layer (not shown) for sending and receiving messages to and from the nodes.

Once data is loaded and a query is inputted into the system by a user, the compiler layer converts the user query to data parallel source code and then to executable code. The data parallel source code is preferably C++, but is not limited to C++. The executable code is dynamically loaded to each node in the cluster and is executed on the nodes. The executable code then makes calls to features in the multithreaded graph library and to features in the multithreaded runtime library.

The multithreaded graph library is a library of multithreaded algorithms, processes, and data structures. The multithreaded runtime library implements compiled code at runtime. The data structures are implemented in a partitioned global address space managed by the multithreaded runtime library. The data structures include, but are not limited to, an array, table, graph and dictionary with APIs to access them. The multithreaded runtime library exposes to the multithreaded graph library an API that permits allocating, accessing, and freeing data in the global address space.

The multithreaded graph library manages the graph database and query execution. Further, the multithreaded graph library generates the graph database and the related dictionary by ingesting data. Data can, for example, be RDF triples stored in N-Triples format.

The multithreaded runtime library provides the features that enable management of the data structures and load balancing across the nodes of the cluster. The runtime library also employs a control model typical of shared-memory systems: fork join parallel constructs that generate thousands of lightweight threads. These lightweight threads allow hiding the latency for accessing data on remote cluster nodes; they are switched in and out of processor cores while communication proceeds. The runtime library also aggregates data requests as appropriate for the operation of the graph database before communicating to other nodes, increasing network bandwidth utilization.

Figure 2A:
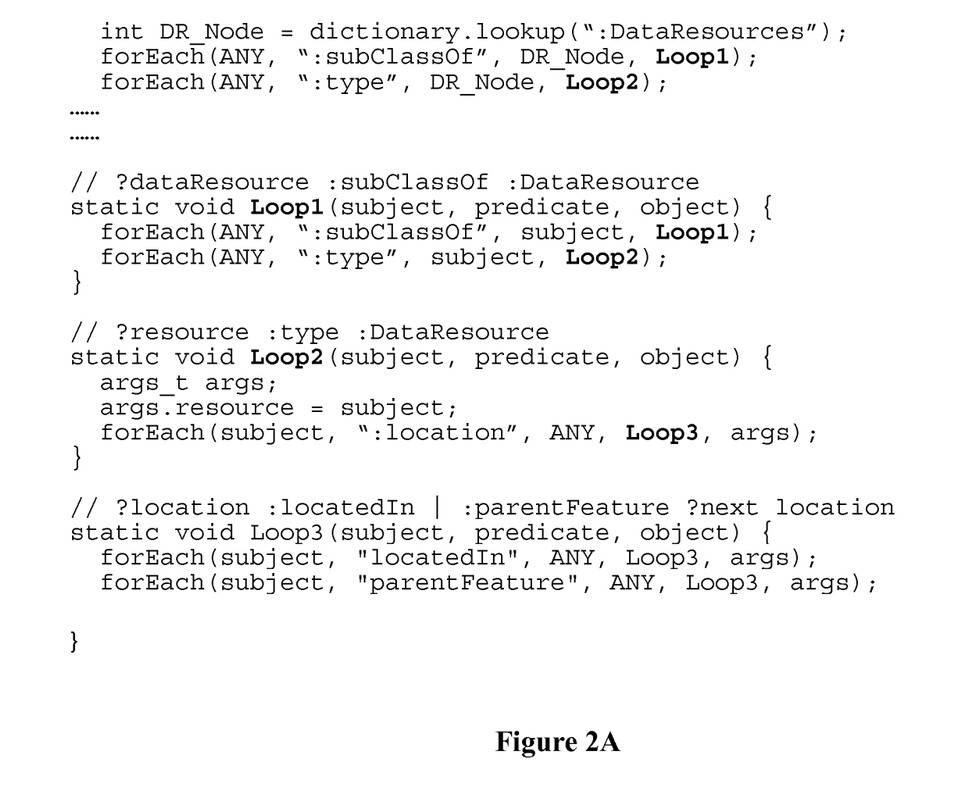
FIG. 2A shows an example of data parallel executable code generated by a compiler, calling APIs in a library of multithreaded algorithms, processes, and data structures.
Figure 2B:
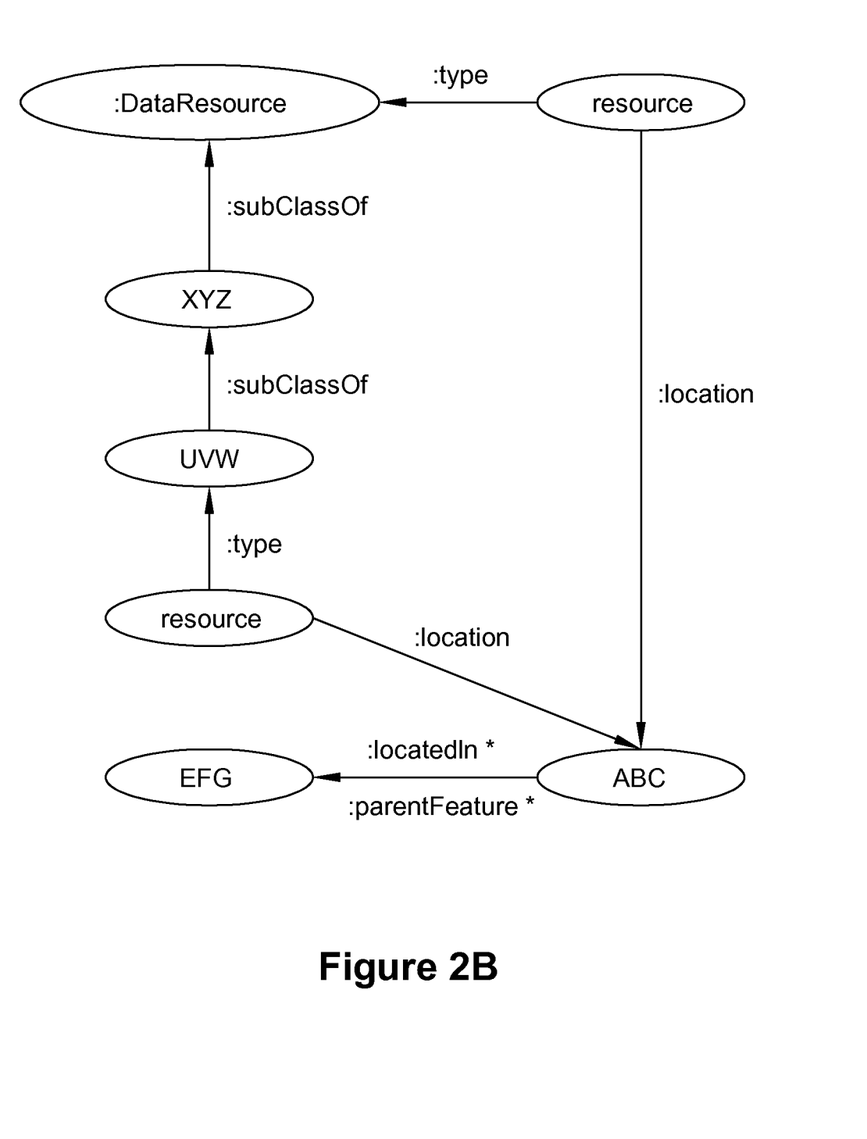
FIG. 2B is a graphical view of the data parallel executable code in FIG. 2A.

FIG. 2A shows an example of data parallel executable code generated by a compiler, calling APIs in a library of multithreaded algorithms, processes, and data structures. FIG. 2B is a graphical view of the data parallel executable code in FIG. 2A.

Each node of the system of FIG. 1 executes an instance of the multithreaded runtime library. Different instances communicate through commands, which describe data, synchronization, and thread management operations. The runtime library is a parallel runtime library with different types of specialized threads. One objective is to exploit the cores of modern processors to support the functionalities of the runtime. These specialized threads include, but are not limited to, the following:

Worker: executes application code, in the form of lightweight threads, and generates commands directed to other nodes;

Helper: manages global address space and synchronization and handles incoming commands from other nodes; and Communication Server: it manages all incoming/outgoing communications at the node level in the form of network MPI messages.

The specialized threads may be implemented as POSIX threads, each one pinned to a core. The communication server employs MPI to send and receive messages to and from other nodes. There may be multiple helpers and workers per node and a single communication server.

The multithread graph library contains data structures that are implemented using shared arrays in global address space of the multithreaded runtime library. Among them, there are the graph data structures the terms dictionary, and arrays and tables associated with the collection and reduction of results. The dictionary is used to map vertex and edge labels to unique integer identifiers. This allows compression of the graph representation in memory as well as performs label/term comparisons much more efficiently. The query-to-source code compiler operates on a shared-memory system and does not need to reason about the physical partitioning of the database. However, the runtime library also exposes locality information, allowing reducing data movements whenever possible. Because graph exploration algorithms mostly have loops that run through edge or vertex lists, the runtime library provides a parallel loop construct that maps loop iterations to lightweight threads. The runtime library supports thread generation from nested loops and allows specifying the number of iterations of a loop mapped to a thread. The runtime library also allows controlling code locality, enabling to spawn or move threads on preselected nodes instead of moving data. Routines of the multithreaded graph library exploit these features to better manage its internal data structures. The routines of the multithreaded graph library access data through put and get communication primitives, moving them into local space for manipulation and writing them back to the global space. The communication primitives are available with both blocking and non-blocking semantics. The runtime library also provides atomic operations, such as atomic addition and test-and-set, on data allocated in the global address space. The multithreaded graph library exploits them to protect parallel operations on the graph datasets and to implement global synchronization constructs for database management and querying.

EXPERIMENTAL SECTION

The following examples serve to illustrate embodiments and aspects of the present invention and are not to be construed as limiting the scope thereof.

The system of the present invention was evaluated on the Olympus supercomputer at the Pacific Northwest National Laboratory Institutional Computing center. Olympus is a cluster of 604 nodes interconnected through a QDR Infiniband switch with 648 ports (theoretical peak at 4 GB/s). Each of Olympus' node features two AMD Opteron 6,272 processors at 2.1 GHz and 64 GB of DDR3 memory clocked at 1,600 MHz. Each socket hosts eight processor modules—two integer cores, one floating point core per module) on two different dies, for a total of 32 integer cores per node.

The system or stack was configured with 15 workers, 15 helpers, and 1 communication server per node. Each worker hosts up to 1,024 lightweight threads. The MPI bandwidth of the Olympus was measured with the OSU Micro-Benchmarks 3.9, reaching a peak around 2.8 GB/s with messages of at least 64 KB. Each communication channel hosts up to four buffers. There are two channels per helper and one channel per worker.

Experimental results of the system were shown on a well-established benchmark, the Berlin SPARQL Benchmark (BSBM). BSBM defines a set of SPARQL queries and datasets to evaluate the performance of semantic graph databases and systems that map RDF into others kinds of storage systems. Berlin datasets are based on an e-commerce use case with millions to billions of commercial transactions, involving many product types, producers, vendors, offers, and reviews. Queries one through six of the Business Intelligence use-case were ran on datasets with 100M, 1B, and 10B, as shown in FIGS. 3A-3C.

Figure 3A:
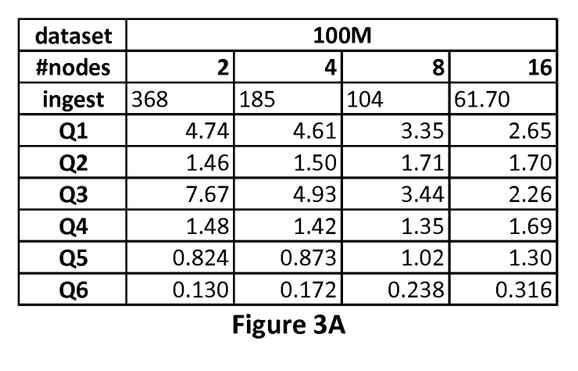
FIG. 3A is a table showing the time, in seconds, to build the system and execute BSBM queries having a data size of 100M triples and from 2 to 16 nodes.
Figure 3B:
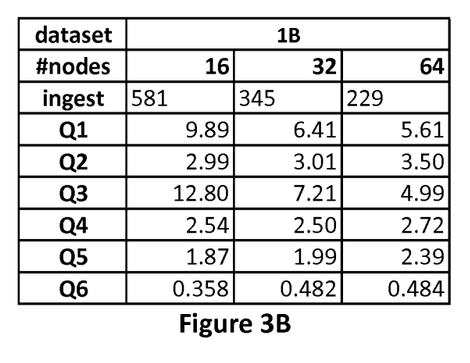
FIG. 3B is a table showing the time, in seconds, to build the system and execute BSBM queries having a data size of 1B triples and from 16 to 64 nodes.
Figure 3C:
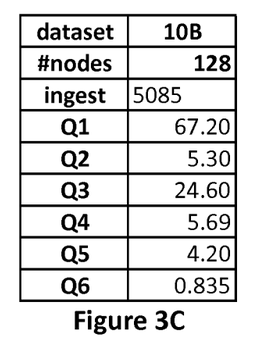
FIG. 3C is a table showing the time, in seconds, to build the system and execute BSBM queries having a data size of 10B triples and 128 nodes.

The tables of FIGS. 3A-3C show the build time of the database or system and the execution time of the queries on 100M triples (FIG. 3A), 1B triples (FIG. 3B), and 10B triples (FIG. 3C), while progressively increasing the number of cluster nodes. Sizes of the input files are 21 GB or 100M triples for FIG. 3A, 206 GB or 1B triples for FIG. 3B, and 2 TB or 10B triples for FIG. 3C. In all cases, the build time scales with the number of nodes. Considering all the three tables FIGS. 3A-3C together, it can be appreciated how the system scales in dataset sizes by adding new nodes, and how it can exploit the additional parallelism available. For example, with 100M triples, queries Q1 and Q3 scale for all the experiments up to 16 nodes. Increasing the number of nodes for the other queries, instead, provides constant or slightly worse execution time. Their execution time is very short, under five seconds, and the small dataset does not provide sufficient data parallelism. These queries only have two graph walks with two-level nesting and, even with larger datasets, the system is able to exploit all the available parallelism already with a limited number of nodes. Furthermore, the database has the same overall size, but is partitioned on more nodes. Thus, the communication increases, slightly reducing performance. With 1B triples, as shown in FIG. 3B, similar behavior is observed. In this case, however, query Q1 stops scaling at 32 nodes. With 64 nodes, the system can execute queries on 10B triples. Query Q3 still scales in performance up to 128 nodes, while the other queries, except Q1, maintain approximately stable performance. Query Q1 experiences the highest decrease in performance when using 128 nodes because its tasks present higher communication intensity than the other queries, and the system already exploited all the available parallelism with 64 nodes. These data confirm that the system of the present invention can maintain constant throughput when running sets of mixed queries in parallel.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method for storing and analyzing information comprising:
    receiving, at runtime, a graph database query specified in a query language;
    during the runtime, converting the query to data parallel source code;
    during the runtime, with a compiler layer, compiling the data parallel source code to provide executable code;
    during the runtime, dynamically loading the executable code onto a plurality of computing elements;
    during the runtime, executing the executable code, the executing comprising:
        calling one or more methods of a graph database library, the graph database library comprising multithreaded algorithms, processes, and data structures for managing the graph database and query execution, the graph database library comprising a plurality of methods for accessing the multithreaded algorithms, processes, and data structures, one or more of the methods being called by the executable code;
        calling one or more methods of a multithreaded runtime library, the multithreaded runtime library comprising a plurality of methods for implementing a global address space and thread management, the calling the one or more methods of the multithreaded runtime library comprising:
            calling an API of the multithreaded runtime library to allocate memory in the global address space; and
            calling an API of the multithreaded runtime library to free memory in the global address space;
        calling a method of the graph database library to instantiate at least one data structure of the graph database library in the global address space, the global address space being partition between the plurality of computing elements;
        with the runtime library, aggregating data requests for a computing element of the plurality of computing elements;
        with the runtime library, sending the aggregated data requests to the computing element of the plurality of computing elements; and
        returning query execution results in response to the graph database query.

2. The method of claim 1 wherein the query language is SPARQL and the data parallel source code is C++.

3. The method of claim 1 wherein the data structures of the library of multithreaded algorithms, processes, and data structures are implemented in a partitioned, global address space managed by the multithreaded runtime library.

4. The method of claim 1, wherein the multithreaded runtime library exposes to the library of multithreaded algorithms, processes, and data structures an Application Programming Interface (API) that permits scheduling of threads to computing elements for execution.

5. The method of claim 1, further comprising a MPI message passing layer for sending and receiving messages to and from the computing elements.

6. The method of claim 1, wherein the data structures of the library of multithreaded algorithms, processes, and data structures include an array, table, graph and dictionary with APIs to access them.

7. The method of claim 1, wherein a routine of the multithreaded graph library moves data to a local address space for manipulation and then writes them back to the global address space.

8. The method of claim 1, wherein the data structures of the multithreaded graph library are implemented using shared arrays in the global address space.

9. The method of claim 1, wherein each computing element executes an instance of the multithreaded runtime library.

10. The method of claim 1, wherein the executing further comprises:
    generating at least a first worker thread, the at least a first worker thread executing application code;

generating at least a first helper thread, the at least a first helper thread managing the global address space and synchronizing commands from at least a portion of the plurality of computing elements; and generating at least a first communication server thread, the at least a first communication server thread managing incoming and outgoing communications for at least one computing element of the plurality of computing elements.

11. The method of claim 1, wherein the executing further comprises:

creating a dictionary data structure using the multithreaded graph library; and with the dictionary data structure, mapping vertex and edge labels of a graph to unique integer identifiers.

12. A method of implementing a graph database with an oversubscription of threads to computing elements comprising:

receiving a query, at runtime, specified in a query language;

during the runtime, converting the query to data parallel source code;

during the runtime, compiling the data parallel source code to provide data parallel executable code;

loading the data parallel executable code onto computing elements; and executing the data parallel executable code, the executing comprising:

calling at least one method of a graph database library of multithreaded algorithms, processes, and data structures for managing a graph database and query execution, the calling at the least one method of the graph database library comprising calling a method to instantiate at least one of the data structures;

calling at least a first method and at least a second method of a multithreaded runtime library for implementing a global address space and thread management, the at least a first method allocating memory in the global address space and the at least a second method freeing memory in the global address space, wherein the at least one of the data structures is implemented in memory allocated by the at least a first method; and returning query execution results in response to the query.

13. The method of claim 12 wherein the query language is SPARQL and the data parallel executable code is C++.

14. The method of claim 13 further comprising providing an MPI message passing layer for sending and receiving messages to and from the computing elements.

15. The method of claim 12 wherein the data structures of the library of multithreaded algorithms, processes, and data structures are implemented in a partitioned, global address space managed by the multithreaded runtime library.

16. The method of claim 15 wherein the multithreaded runtime library exposes to the library of multithreaded algorithms, processes, and data structures an API that permits allocating, accessing, and freeing data in the partitioned, global address space.

17. The method of claim 12 wherein the multithreaded runtime library exposes to the library of multithreaded algorithms, processes, and data structures an API that permits scheduling of threads to computing elements for execution.

18. The method of claim 12 wherein the data structures of the library of multithreaded algorithms, processes, and data structures include an array, table, graph and dictionary with APIs to access them.

19. A method of implementing a graph database with an oversubscription of threads to computing elements comprising:

receiving a user SPARQL query during runtime;

during the runtime, converting the user SPARQL query to a C++ source code;

during the runtime, compiling the C++ source code to produce an executable code;

loading the executable code onto computing elements;

executing the executable code, the executing comprising:

making program calls to a graph database library of multithreaded algorithms, processes, and data structures for managing a graph database and query execution, wherein making program calls to the graph database library comprises:

calling the graph database library to create at least one of an array, a table, a graph, and a dictionary using an API of the graph database library; and making program calls to a multithreaded runtime library comprising a plurality of methods for implementing a global address space and thread management wherein the multithreaded runtime library exposes to the library of multithreaded algorithms, processes, and data structures an API that permits allocating, accessing, and freeing data in the partitioned global address space, the making program calls to the multithreaded runtime library comprising:

calling an API of the multithreaded runtime library to allocate memory; and calling an API of the multithreaded runtime library to free memory;

sending and receiving messages to and from the computing elements using a MPI message passing layer; and returning query execution results in response to the user SPARQL query.

20. The method of claim 19 wherein the data structures of the library of multithreaded algorithms, processes, and data structures are implemented in a partitioned, global address space managed by the multithreaded runtime library.

21. The method of claim 19 wherein the multithreaded runtime library exposes to the library of multithreaded algorithms, processes, and data structures an API that permits scheduling threads to computing elements.

22. The method of claim 19, wherein the executing further comprises:

creating a dictionary data structure using the multithreaded graph library; and with the dictionary data structure, mapping vertex and edge labels of a graph to unique integer identifiers.

23. The method of claim 19, wherein the executing further comprises:

generating at least a first worker thread, the at least a first worker thread executing application code;

generating at least a first helper thread, the at least a first helper thread managing the global address space and synchronizing commands from at least a portion of the computing elements; and generating at least a first communication server thread, the at least a first communication server thread managing incoming and outgoing communications for at least one computing element of the computing elements.

24. One or more non-transitory computer-readable media comprising computer-executable instructions that, when executed, cause a computing system to perform processing to implement a graph database query processor, the processing comprising:
   at runtime, receiving a query specified in a query language;
   converting the query to data parallel source code;
   compiling the data parallel source code to produce data parallel executable code;
   loading the executable code onto a plurality of computing elements; and
   executing the executable code, the executing comprising:
      making program calls to a graph database library of multithreaded algorithms, processes, and data structures for managing a graph database and query execution, the making program calls to the graph database library comprising:
         calling an API of the graph database library to instantiate at least one data structure; and
      making calls to a multithreaded runtime library comprising a plurality of methods for implementing a global address space and thread management, the making calls to the multithreaded runtime library comprising:
         calling an API of the multithreaded runtime library to allocate memory in the global address space; and
         calling an API of the multithreaded runtime library to free memory in the global address space; and
      returning query execution results in response to the query.

25. The one or more computer-readable media of claim 24, wherein the data structures of the library of multithreaded algorithms, processes, and data structures are implemented in a partitioned, global address space managed by the multithreaded runtime library.

26. The one or more computer-readable media of claim 24, wherein the data structures of the library of multithreaded algorithms, processes, and data structures include an array, table, graph, and dictionary, with APIs to access them.

27. The one or more computer-readable media of claim 24, wherein the multithreaded runtime library exposes to the library of multithreaded algorithms, processes, and data structures an API that permits allocating, accessing, and freeing data in the partitioned, global address space.

28. The one or more computer-readable media of claim 24, wherein the multithreaded runtime library exposes to the library of multithreaded algorithms, processes, and data structures an API that permits scheduling threads to computing elements.

* * * * *